United States Patent
Karte

(10) Patent No.: US 9,690,277 B2
(45) Date of Patent: Jun. 27, 2017

(54) POSITIONER

(75) Inventor: Thomas Karte, Bruchkoebel (DE)

(73) Assignee: SAMSON AG, Frankfurt am Main (DE)

( * ) Notice: Subject to any disclaimer, the term of this patent is extended or adjusted under 35 U.S.C. 154(b) by 585 days.

(21) Appl. No.: 13/456,081

(22) Filed: Apr. 25, 2012

(65) Prior Publication Data
US 2012/0275504 A1 Nov. 1, 2012

(30) Foreign Application Priority Data

Apr. 29, 2011 (DE) .................. 10 2011 050 007

(51) Int. Cl.
G05B 19/04 (2006.01)
G05B 19/042 (2006.01)

(52) U.S. Cl.
CPC ................ G05B 19/0423 (2013.01)

(58) Field of Classification Search
CPC ............ G05B 19/0423; G05B 19/19; G05B 2219/45006; G05B 9/02; Y10T 137/7761; F16K 37/0083
USPC ............ 700/1, 302, 56; 251/129.04; 702/108
See application file for complete search history.

(56) References Cited

U.S. PATENT DOCUMENTS

| | | | |
|---|---|---|---|
| 5,431,182 A * | 7/1995 | Brown | G05B 6/05 137/487.5 |
| 5,451,923 A * | 9/1995 | Seberger | G08C 19/02 340/12.32 |
| 5,651,385 A | 7/1997 | Karte | |
| 6,140,940 A * | 10/2000 | Klofer | G08C 19/02 340/12.32 |
| 6,512,960 B1 * | 1/2003 | Schulz | 700/56 |
| 7,862,003 B2 | 1/2011 | Karte et al. | |
| 8,358,140 B2 | 1/2013 | Somfalvy | |
| 2002/0000798 A1 * | 1/2002 | Schweitzer | 323/312 |

(Continued)

FOREIGN PATENT DOCUMENTS

CN 2250535 Y * 3/1997
DE 102008037302 A1 2/2010

OTHER PUBLICATIONS

Riyaz Ali & Leroy Jero, Fisher Controls International LLC, Smart Positioners in Safety Instrumented Systems, Reliability and Asset Management, PTQ Winter Mar. 2002, pp. 1-4.

(Continued)

Primary Examiner — Jason Lin
(74) Attorney, Agent, or Firm — Woodling, Krost and Rust

(57) ABSTRACT

The invention relates to a positioner (10) for an actuator (12) comprising a processing unit (22) and an output unit (20) which can be connected to an actuating drive (15) of an actuator (12), as well as a measurement unit (24). The invention is characterized in that said positioner (10) comprises a current source (26) which can be connected to a voltage source (30) of a control system (14) via a single two-wire current loop (28). The invention furthermore relates to a method for operating a positioner (10) including the transmission of measuring values recorded in the positioner (10) to a higher-level controller (14). The method is characterized in that the actuating signals are transmitted in a digital form whereas the measuring data is transmitted to a higher-level controller in an analog form, with both digital and analog signals being transmitted on the same two-wire line.

4 Claims, 1 Drawing Sheet

(56) References Cited

U.S. PATENT DOCUMENTS

| | | | | |
|---|---|---|---|---|
| 2002/0101748 | A1* | 8/2002 | Loechner | 363/84 |
| 2004/0124854 | A1* | 7/2004 | Slezak | 324/644 |
| 2005/0075817 | A1* | 4/2005 | Kah et al. | 702/108 |
| 2006/0266966 | A1* | 11/2006 | Karte | F16K 37/0083 251/129.04 |
| 2006/0273776 | A1* | 12/2006 | Smart | G05B 19/0423 323/304 |
| 2007/0018127 | A1* | 1/2007 | Seberger | 251/129.04 |
| 2008/0097652 | A1* | 4/2008 | Koenig | 700/282 |
| 2009/0110039 | A1* | 4/2009 | Kort | 375/222 |
| 2010/0033192 | A1* | 2/2010 | Somfalvy | 324/555 |
| 2010/0036542 | A1* | 2/2010 | Karte | 700/302 |
| 2010/0077111 | A1* | 3/2010 | Holmes et al. | 710/33 |

OTHER PUBLICATIONS

German Patent Office, English Translation of GPTO Examination Report, Mar. 22, 2012, pp. 1-8, File No. 102011050007.3.

European Patent Office, English Translation of the EPO Examination Report, Aug. 30, 2012, pp. 1-4, Application No. 12165361.2.

European Patent Office, English Translation of the EPO Examination Report, Sep. 9, 2013, pp. 1-3, Application No. 12165361.2.

English Translation of European Patent Office, Office Action, Apr. 16, 2014, Application No. 12165361.2-1802, Applicant: Samson Aktiengesellschaft, pp. 1-3.

European Patent Office, Office Action, Apr. 16, 2014, Application No. 12165361.2-1802, Applicant: Samson Aktiengesellschaft, pp. 1-5.

\* cited by examiner

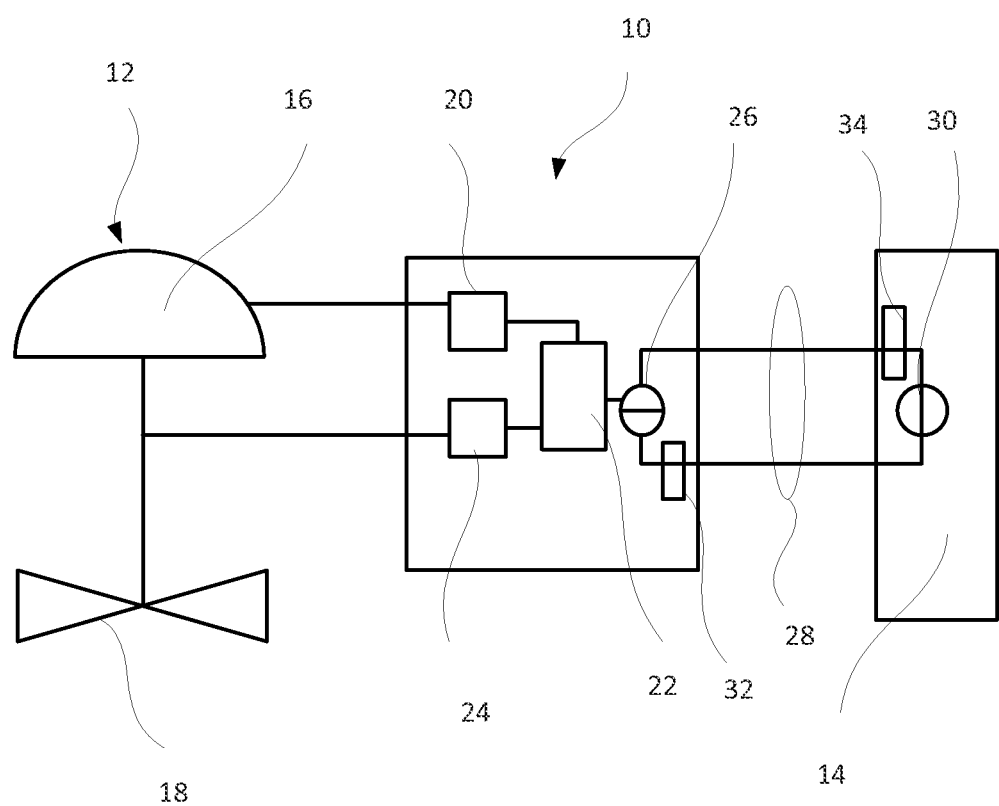

POSITIONER

This patent application claims priority to and the benefit of German Patent Application No. 10 2011 050 007.3 filed Apr. 29, 2011 which is incorporated herein in its entirety by reference hereto.

The invention relates to a positioner for an actuator in a safety-related circuit as well as to a method hod for operating a positioner.

A positioner for an actuator, comprising a processing unit, a desired value receiving unit, an output unit, in particular a pneumatic output unit which can be connected to an actuating drive of an actuator, is already known from the prior art. Moreover, a positioner comprises a processing unit. This processing unit can be used in combination with associated sensors to collect diagnostic data from the actuator.

Also known from the prior art is the use of a current loop for transferring the desired values for the valve position, in particular by impressing a current of between 4 and 20 mA in the loop.

Moreover, it is possible to transmit a digital signal through frequency modulation of the power transmission. This may for example be accomplished according to the HART communication protocol. A respective receiver in the positioner can then evaluate the transmitted command and trigger the desired actions via a processing unit. For diagnostic purposes, an on-site positioner mounted on the actuator can gather diagnostic data and transmit the result by means of the digital data transmission to a higher-level controller. In general, the software of the positioner which is used on site on the actuator to collect diagnostic data was not developed according to IEC 61508. For this reason, the reliability of the results obtained from the diagnosis may be doubted.

For obtaining reliable diagnostic data, the measuring results have to be transmitted to a higher-level controller. Contrary to the positioner software, however, the higher-level controller software was developed in compliance with the IEC 61508 standard.

Another approach to implementing the transmission of the measuring results, in particular of a distance measurement, to the higher-level controller, is to provide a second current loop for this purpose. However, this solution has the disadvantage that an additional design of an IEC 61508 certified feedback unit would by far exceed the cost of the device:

It is the object of the invention to provide reliable information on the actual position and/or the actual positioning path of the valve, and this is to be implemented in a way that is as simple, robust and inexpensive as possible und allows an IEC 61508 certified evaluation.

As is generally known, a positioner for an actuator comprises an output unit which can be connected to the positioner of the actuator. Furthermore, a processing unit is provided, at least for controlling the output unit. Moreover, the positioner comprises a single two-wire current loop which connects the positioner to a higher-level controller. Said higher-level controller impresses a current of between e.g. 4 and 20 mA in this current loop. This current signalizes the desired value of the actuator position and will be received and evaluated accordingly by the positioner.

The invention is characterized in that this single two-wire current loop connects the positioner to a voltage source, which voltage source is allocated to the higher-lever controller. On the positioner side, the two-wire current loop is connected to a current modulator. Said current modulator is connected to further positioner components.

The current modulator may preferably be designed as a controllable current source which is provided at the positioner side end of the two-wire current loop.

In particular, depending on the result of the distance measurement, the processing unit will impress a respective current in the controllable current source provided at the positioner side end of the two-wire current loop in a parameterized manner.

Thus the current modulator can be used for an analog transmission of a signal, in the form of a respectively impressed current, to the higher-level controller where it will then be evaluated reliably by means of software that was developed in particular in compliance with the IEC 61508 standard.

Preferably, the signal transmitted to the higher-level controller is a measuring value recorded by data acquisition components.

In addition, the positioner preferably includes a communication unit for a modulated digital signal that is transmitted by the two-wire current loop. This digital signal can be used to transmit desired position values to the actuator, which is no longer possible by means of an analog signal due to the suggested activation, since the two-wire current loop already handles the output signal. The communication unit then converts the digital signal into a message that can be correctly interpreted by the processing unit.

In addition to the digital message, a respective desired position value or a sequence of desired position values can also be stored in the processing unit. Based on these desired values thus specified, the output unit, which is in particular of the pneumatic type, can be controlled by the processing unit in such a manner that the actuator will then reach the position corresponding to this desired value.

This configuration is particularly advantageous for the Partial Stroke Testing (PST) of safety actuators. In this case, specified desired position values which constitute a partial stroke of the actuator are reached as a rule. For reaching these desired position values, the travel speed of the actuator may be very high, which clearly makes it difficult to measure the travel distance by means of the positioner or the means available to the latter. The desired position values are then transmitted in a digital and not time-critical manner and processed fast by the processing unit. The time-critical signal of the distance measurement can be transmitted to the higher-level controller in an analog form where it will then be evaluated in compliance with IEC 61508.

In this way, the actuator positions on the positioner may thus be pre-implemented on the processing unit and be triggered by a digital command. With the positioning signal being swapped out, the analog 4-20 mA current modulation will no longer be required for the transmission of the desired position value. Consequently, it can be used according to the invention to carry the time-critical distance measurement data recorded by the distance measurement unit. Such data can then be transmitted to the higher-level controller and be evaluated by it. The IEC 61508 certified higher-level controller is capable of reliably checking the function of a safety actuator.

As only a single two-wire current loop will be required, this safety-relevant test may be implemented in a very low-cost and safe manner.

It is considered particularly advantageous to also store test procedures for testing the actuator in the processing unit of the positioner. These test procedures may likewise be triggered by a digital command. The test result can then either be recorded in the processing unit through evaluation of associated measuring units and the result can be digitally transmitted, or, for time-critical requirements, it may directly fed back to the higher-level controller by the two-wire current loop.

In a particularly advantageous embodiment, the actuator and the positioner may be equipped with distance measurement components. The measured distance is converted into a 4 to 20 mA signal in the positioner and transmitted to a higher-level controller, in particular an SPS, which then records and evaluates it with a metering time period of less than 50 ms. The signal can be converted using an analog electronic circuit that was developed and certified according to IEC 61508. Alternatively, the distance measurement signal can be supplied to the processing unit which will then suitably modulate the current source for transmission of the desired information.

As a result, the mapping of the distance measurement to the impressed current will also occur within at least the same metering time period and the positioner components will be suitably designed.

Preferably, the voltage source connected to the two-wire current loop can be used as a power supply for the processing unit and a pneumatic output unit. Alternatively, an additional voltage source may be provided for this purpose.

In addition, the positioner may include another voltage input which—when charged—can trigger the safety-related venting of the valve. In particular, a control voltage of 24 V is provided for this case. This allows an additional safety mechanism to be provided for the actuator. Venting the pneumatic drive may for example be performed according to the prior art disclosed in DE 44 29 401.

Alternatively, according to a particularly advantageous embodiment, the positioner may comprise a safety circuit which will trigger safety-related venting of the actuator when the supply voltage of the two-wire current loop drops to zero volts.

Since this will cut off the power supply to the positioner, the valve movement can be observed by means of a device according to DE 103 44 088 including an internal energy storage and stored in an internal data storage in a mains failsafe way.

Lastly, safety-related venting can also be triggered by a command based on the HART communication protocol.

In particular, the digital frequency-modulated communication is implemented in the form of the HART communication protocol.

The invention furthermore relates to a method for operating a positioner, including a safety-relevant transmission of measurement values recorded in the positioner to a higher-level controller. According to the invention, the actuating signals are digitally transferred from the higher-level controller to the positioner, whereas the measurement values are transmitted to a higher-level controller in an analog form. This is accomplished by means of a single two-wire current loop. As a result, this method can be performed in a very low-cost manner and will still be extremely precise and reliable.

Preferably this method can be used for operating a positioner, above all for operating a safety actuator. This method is particularly useful for performing Partial Stroke Tests.

Further advantages, features and possible applications of the present invention will become obvious from the description which follows, in combination with the embodiments illustrated in the single drawing.

Throughout the description, claims and the single drawing, such terms and associated reference numerals will be used as are listed in the list of reference numerals below. In the single drawing, FIG. 1 is a schematic view of a positioner connected to an actuator and a control system.

FIG. 1 is a schematic view of an actuator 12 which is connected to a higher-level control system 14 via a positioner 10 and can be controlled by said control system 14. The actuator 12 comprises a drive 16 and a control valve 18.

Said positioner 10 is mounted on said actuator 12 and the actuator drive 16 is connected to a pneumatic output unit 20. This pneumatic output unit 20 is controlled by a processing unit 22. Moreover, the actuator 12 is connected to a distance measurement unit 24 which is also integrated in the positioner 10.

The positioner 10 is connected to the control system 14 via a single two-wire current loop 28. For supplying power to the two-wire current loop 28, a voltage source 30 is provided in the control system 14. A current source 26 is provided on the positioner side of the two-wire current loop 28.

This current source 26 can be controlled by the processing unit 22 in such a manner that it will impress a suitable current in the two-wire current loop 28 as a function of the signals measured by the distance measurement unit 24. In one embodiment, the current impressed will be between 4 and 20 mA.

By impressing a current corresponding to the value of the travel distance of the actuator 12 measured by the distance measurement unit 24, the position path taken by the actuator 12 can be detected by the control system 14.

The control system 14 is equipped with software that was developed in compliance with IEC 61508. This thus allows the position path of the actuator 12 to be recorded in a reliable and significant manner.

Actuating the safety actuator 12, in particular for a Partial Stroke Test, is to be effected through communication via the two-wire current loop 28. Such digital communication takes the form of a HART command, for which purpose communication means 32, 34 are connected to the two-wire current loop. These HART commands are for example output by the control system 14 and received by the positioner 10 in order to initiate a Partial Stroke Test. The processing unit 22 of the positioner stores various positions of the actuator. After triggering, for example of the Partial Stroke Test, these positions can be reached by controlling the pneumatic output unit 20 by means of the processing unit 22. The distance measurement unit 24 will then transmit the actual travel path to the control system 14 via the processing unit 22 and the current source 26.

This allows verification as to whether a Partial Stroke Test was performed successfully. This embodiment requires only one two-wire current loop 28 for performing the Partial Stroke Test on an actuator 12 on the one hand, and for transmitting the actual travel path to the control system 14 which will then record and evaluate it using IEC 61508 certified software.

LIST OF REFERENCE NUMERALS 10 positioner
12 actuator
14 control system
16 drive
18 valve
20 pneumatic output unit
22 processing unit
24 distance measurement
26 current source
28 two-wire current loop 30 voltage source
32 communication unit
34 communication unit

The invention claimed is:
1. A system comprising:
a positioner for an actuator connected to a control system via a single two-wire current loop; wherein said control system controls an analog current in said single two-wire current loop to be a first analog current value to control the actuator;
wherein said positioner comprises: a processor; a sensor; an output; a current source on said positioner, and a Highway Addressable Remote Transducer (HART) communication unit;
wherein said control system comprises another HART communication unit and a voltage source;
wherein said actuator comprising an actuating drive;
said actuating drive operating said actuator;
said output is connected to said actuating drive operating said actuator;
said sensor measuring a positional parameter of said actuator;
said processor is connected to said HART communication unit of said positioner, said sensor, said current source and said output, said processor is capable of controlling said current source so that said analog current in said single two-wire current loop becomes a second analog current value, wherein said second analog current is a function of said positional parameter measured by said sensor; and said processor stores predefined position values of said actuator corresponding to a digital command; and
said HART communication unit of said control system transmits said digital command through said single two-wire current loop to said HART communication unit of said positioner, and; in response of receiving said digital command by said first HART communication unit, said processor controls said actuating drive based on said digital command and said predefined position values and said processor controls said current source so that said analog current in said single two-wire current loop becomes said second analog current value, said control system receives said second analog current value through said single two-wire current loop for evaluation, wherein said digital command triggers a Partial Stroke Test of said actuator.

2. The system as claimed in claim 1, wherein:
said sensor is a distance sensor.

3. The system as claimed in claim 1, wherein: said current source supplies a current between 4 and 20 mA in said single two-wire current loop.

4. The system as claimed in claim 1, further comprising: said voltage source supplies said output with power.

* * * * *

UNITED STATES PATENT AND TRADEMARK OFFICE
CERTIFICATE OF CORRECTION

| | | |
|---|---|---|
| PATENT NO. | : 9,690,277 B2 | Page 1 of 1 |
| APPLICATION NO. | : 13/456081 | |
| DATED | : June 27, 2017 | |
| INVENTOR(S) | : Karte | |

It is certified that error appears in the above-identified patent and that said Letters Patent is hereby corrected as shown below:

In the Specification

Column 1, Line 50, after "possible" delete "und" and insert --and-- therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*